(12) United States Patent
Moulene et al.

(10) Patent No.: US 7,607,695 B2
(45) Date of Patent: Oct. 27, 2009

(54) MOTOR VEHICLE WITH LIMITED ANGLE OF INCLINATION

(76) Inventors: Daniel Moulene, 388 avenue des Bigochets, F-78670, Villennes-sur-Seine (FR); Thierry Moulene, 388 avenue des Bigochets, F-78670, Villennes-sur-Seine (FR)

( * ) Notice: Subject to any disclaimer, the term of this patent is extended or adjusted under 35 U.S.C. 154(b) by 189 days.

(21) Appl. No.: 11/631,195

(22) PCT Filed: Jul. 7, 2005

(86) PCT No.: PCT/IB2005/001929

§ 371 (c)(1),
(2), (4) Date: Feb. 9, 2007

(87) PCT Pub. No.: WO2006/003489

PCT Pub. Date: Jan. 12, 2006

(65) Prior Publication Data

US 2008/0197597 A1 Aug. 21, 2008

(30) Foreign Application Priority Data

Jul. 7, 2004 (FR) ................................... 04 07588
Dec. 9, 2004 (FR) ................................... 04 13131

(51) Int. Cl.
*B62D 1/18* (2006.01)
(52) U.S. Cl. ................. 280/775; 280/5.507; 280/5.508; 280/6.154

(58) Field of Classification Search ................. 280/775, 280/776, 755, 5.507, 5.508, 5.509, 6.154, 280/6.155
See application file for complete search history.

(56) References Cited

U.S. PATENT DOCUMENTS

| 4,546,997 | A  | * | 10/1985 | Smyers  | ................... | 280/5.509 |
| 5,437,467 | A  | * | 8/1995  | Patin   | ................... | 280/6.154 |
| 6,511,078 | B2 | * | 1/2003  | Sebe    | ................... | 280/5.509 |
| 6,817,617 | B2 | * | 11/2004 | Hayashi | ................... | 280/5.509 |
| 7,407,173 | B2 | * | 8/2008  | Walker  | ................... | 280/124.134 |
| 2004/0051260 | A1 | * | 3/2004 | Oldiges | ................... | 280/5.507 |

* cited by examiner

*Primary Examiner*—Toan C To
(74) *Attorney, Agent, or Firm*—Oliff & Berridge, PLC

(57) ABSTRACT

The invention relates to a motor vehicle (1) of the type with four wheels (10), which consists of: a driver's cab which is only large enough to accommodate one person widthways and which is solidly connected to a chassis comprising a driver protection structure (4); and means for balancing the vehicle when negotiating bends and/or on surfaces that are inclined in relation to the horizontal, by inclining the chassis and the two front wheels simultaneously. The vehicle also comprises inclination-locking means which are actuated automatically when the vehicle is stopped or travelling at a reduced speed. The inventive vehicle further comprises means for limiting the angle of inclination to a maximum value such that, when stopped, the vehicle does not tilt.

15 Claims, 4 Drawing Sheets

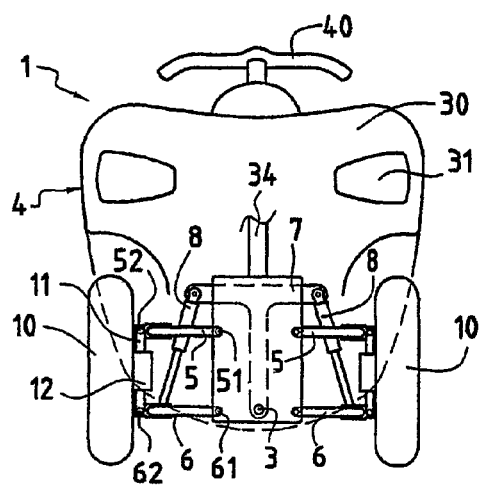
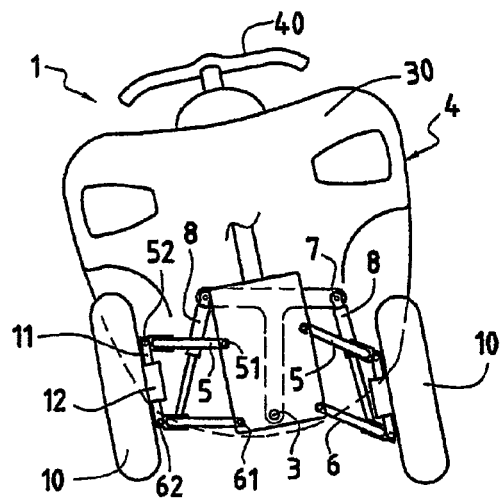
FIG.3   FIG.4
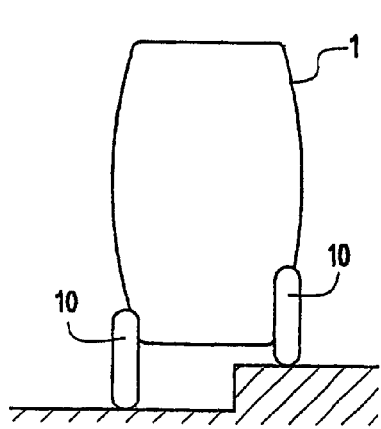
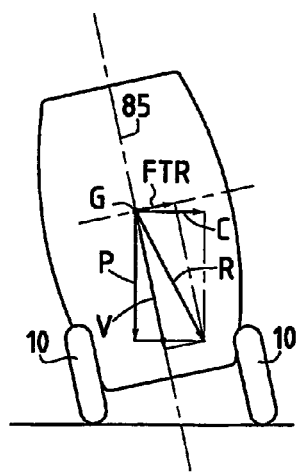
FIG.9   FIG.10

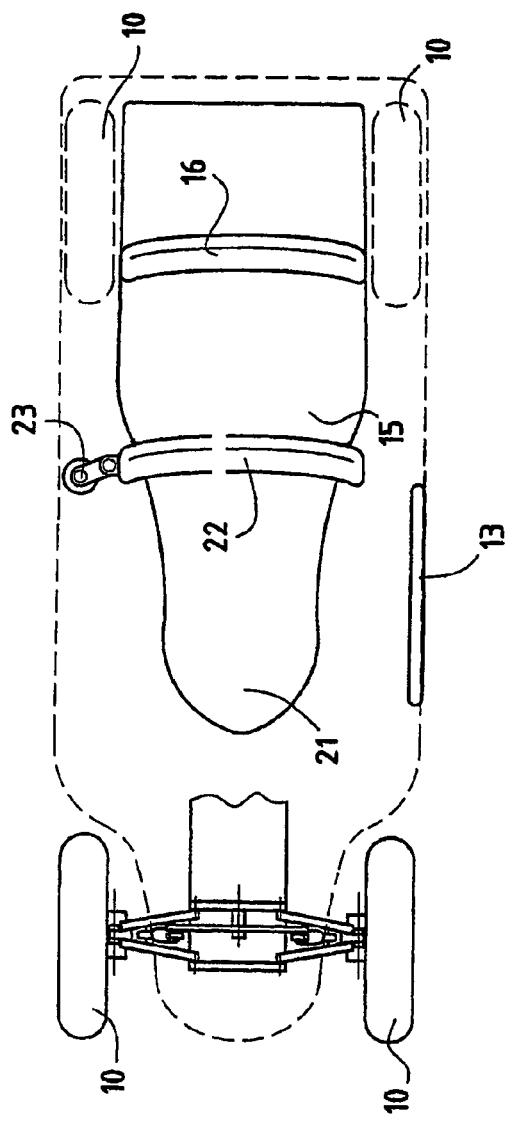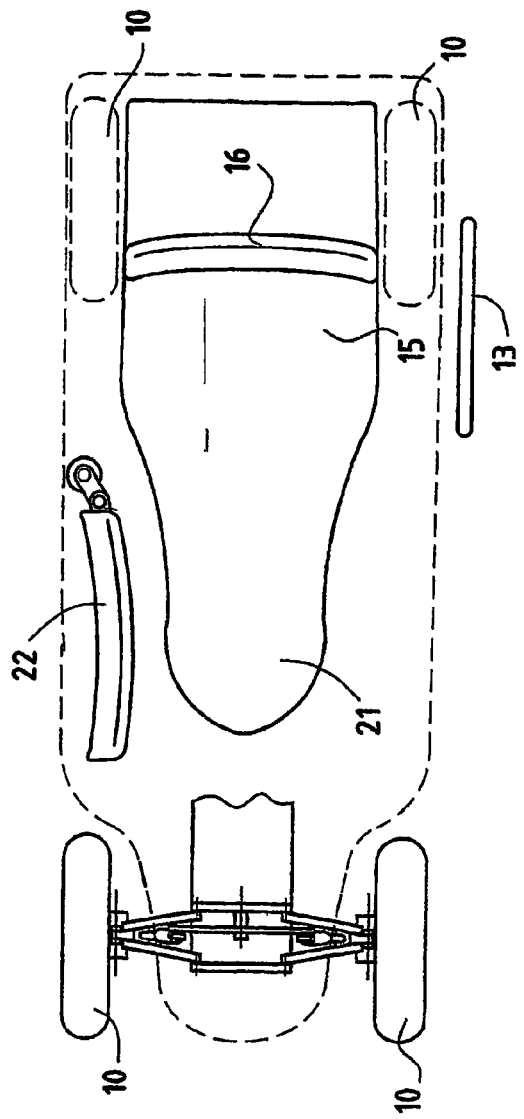

MOTOR VEHICLE WITH LIMITED ANGLE OF INCLINATION

BACKGROUND

The present invention relates to the design and construction of a four-wheeled motor vehicle.

SUMMARY

The vehicle according to the invention is particularly designed and adapted for urban travel. It must however be understood that the vehicle according to the invention is not limited to city use. It can equally well be used in rural areas and for long distance travel.

The number of four-wheeled motor vehicles, especially cars, in urban roads is continually increasing, and this is explained in part by the fact that the purchasing power of each household is rising. This is the reason for the many traffic queues in and around cities. The increasing number of cars on the roads is also the reason for the shortage of urban parking spaces.

It is because of these problems that some drivers prefer two-wheeled motor vehicles such as motorcycles to cars. Motorcycles have the advantage of being easy to park in built-up areas because of their small dimensions compared with those of a car, and they filter easily through urban traffic. But such vehicles have their own drawbacks. Unlike cars, they offer no significant protection to the driver, which is why accidents involving a motorcyclist are so serious when they occur. In addition, driving such machines can very quickly become difficult in poor weather such as wind, which can blow two-wheeled vehicles over, or rain making the road surface slippery. Driving such machines is much more dangerous than driving vehicles of the car type, especially on slippery roads, because in a skid a motorcyclist may drop the vehicle on the ground and therefore suffer very serious injuries.

Against the backdrop of the prior art, as described in particular in American patent U.S. Pat. No. 6,149,226 and in French patent application published under the number 2 831 866, it is a particular object of the present invention to reduce urban parking problems and the problems of traffic queues. It is also an object of the invention to reduce the problems of two-wheeled motor vehicles.

The invention relates to a four-wheeled motor vehicle which is designed to take up less space when parked and to be able to pass between two cars of average size in a traffic jam. According to the invention the vehicle has one or more of the features defined and described below, in their various technically functional combinations.

The vehicle according to the invention comprises a driver's seat contained in a cabin of dimensions such that it can accommodate in width only one person. The vehicle is thus narrower than conventional cars, whose cabins are designed to accommodate usually at least two people widthways.

According to the invention, in its preferred embodiments, the cabin is mounted on a chassis built into a driver protection structure, and this structure has, on the sides of the vehicle, a height such that it protects at least the legs of the driver in case of the vehicle rolling onto its side or in case of a crash. Furthermore, this structure can be fitted with a windshield at the front of the vehicle.

The protection structure may be a body with side reinforcements capable of protecting at least the driver's legs. It may also take the form of a complete closed body comprising a roof, a windshield and at least one door.

According to the invention, the vehicle comprises means of balancing when cornering, or when on ground that slopes relative to the horizontal, by inclining simultaneously the chassis, mounted on the vehicle cabin, and the two front wheels of the vehicle, relative to the ground. Said balancing means are connected to the chassis of the vehicle and can be controlled by the driver himself, with or without assistance, or even controlled by automatic means depending on the case.

When, according to the invention, the two front wheels incline at the same time as the cabin inclines, the driving of the vehicle by the driver takes place naturally when cornering.

In another feature specifically of the invention, the vehicle is equipped with locking means that automatically lock the inclination when the vehicle stops or is moving at reduced speed. The driver does not therefore have to stabilize the vehicle at rest with his feet, as would be the case with a two-wheeled vehicle for example.

The locking means are advantageously caused to intervene automatically when the vehicle is coming to a stop, or more precisely when its speed falls below a predetermined threshold speed. The effect of the locking is that the vehicle is then kept at an inclination at the value it had at the moment the lock was applied.

In yet another feature of the invention, the vehicle is equipped with additional means that limit the angle of inclination of the vehicle to a maximum inclination value which is chosen such that the vehicle does not roll over when at rest, on horizontal ground, or even on a slope (corresponding to one wheel on a sidewalk, for example). Hence, if said means of locking the inclination of the vehicle fail, or if they cannot be used for various reasons, such as following an impact between the vehicle and another vehicle, the means that limit the inclination of the vehicle at rest partly compensate for this failure of the locking means.

Additionally, because of the presence of four wheels, defining a quadrilateral of support, the vehicle according to the invention can withstand, while remaining stable, a much greater centrifugal force than a three-wheeled vehicle of the same width, whose polygon of support is triangular. This means that a relatively small inclination of the vehicle will be sufficient to balance the centrifugal force, which is an enormous advantage for many non-motorcyclist users, because the driver does not need special training to drive this vehicle if he knows how to drive a conventional car. The dimensions of this quadrilateral are also an advantage during emergency braking because the safety margin is much greater than the safety margin corresponding to the support triangle of a three-wheeled vehicle, the dimensions of which, for an identical width, are much smaller.

The balancing means are advantageously able to incline the vehicle to an inclination value different from the ideal inclination value and preferably less, while keeping the vehicle balanced. The ideal inclination is here defined as being such that the resultant of the forces applied to the center of gravity of the vehicle or of the tiltable part of the vehicle passes through the longitudinal axis of symmetry of the support polygon of the vehicle.

Advantageously, the balancing means comprise on the one hand means for detecting the residual transverse acceleration to which the vehicle is subject and on the other hand means for locking the inclination of the vehicle as a function of the residual transverse acceleration and at least in the direction of this residual transverse acceleration.

If the actual inclination is less than the ideal inclination, the resultant of the forces can be decomposed into a force along the actual axis pressing the vehicle into the ground and a resultant transverse force (RTF designated as FTR in FIG. 10)

that is perpendicular to the actual axis of the inclination. This force RTF corresponds to a residual transverse acceleration (RTA) which is proportional to it.

The inclination-limiting means advantageously serve to limit the inclination whatever the speed. These means may also limit the inclination to a lower maximum value at reduced speed than at high speed, in order to improve the dynamic behavior of the vehicle. Said balancing means advantageously comprise means that vary the magnitude of the force the driver has to exert to bring about the inclination as a function of the speed of the vehicle such that the force is greater at low speeds than at high speeds.

In a more automated version of the balancing means, the latter comprise a servomechanism controlling the inclination of the chassis and of the wheels. In a particularly advantageous embodiment of the vehicle according to the invention, the same servomechanism also forms the means of locking the inclination, especially at rest and at reduced speed.

A computer system advantageously controls the vehicle balancing means in accordance with a feedback program, the method of operation of which is advantageously decided by the driver. One mode of operation preferably prohibits inclination away from the vertical when the vehicle is moving at a speed slower than a first predetermined threshold speed, and a second mode of operation automatically inclines the vehicle in response to a set value calculated to be optimal until the inclination reaches the maximum value dependent on the speed or until the residual transverse acceleration rises above a threshold or until the derivative of the residual transverse acceleration rises above another threshold.

In a simplified version of the automatic vehicle balancing system according to the invention, the value of the angle of inclination of the vehicle imposed by the servomechanism corresponds to a predetermined fixed percentage of the value of the ideal angle of inclination as defined above, at least up to a first inclination threshold that is advantageously a function of the vehicle's speed.

In order to be able to right the vehicle, particularly when at rest, the vehicle according to the invention is equipped with means for righting it if it is not in the vertical position. In order to activate these righting means, the driver has a means of releasing the locking means when at rest. In a preferred embodiment of the vehicle to which the invention relates, the balancing means comprise superposed triangles and, advantageously, a cam pivoted at a first end on the vehicle chassis, and two damper springs, one end of each of which is attached on one or other side of the chassis to one of the triangles of the axle, preferably the lowest triangle, and as close as possible to the wheel hub for maximum efficiency of said damper springs. The other ends of the two damper springs are pivoted directly on the cam, preferably in such a way that the axis of each of the damper springs remains as close as possible to a vertical direction. This will enable the damper springs to absorb shocks as efficiently as possible when the wheels encounter imperfections in the road (holes and bumps, for example).

In a first embodiment the vehicle is constructed in such a way that the axle does not allow the rear wheels to be inclined. In this embodiment the vehicle has a rear part which does not incline.

Advantageously, in a second embodiment, the vehicle is constructed in such a way that the balancing means incline all four wheels simultaneously. For this purpose the vehicle preferably comprises, at the rear of the vehicle, two superposed triangles and a second rear cam that is advantageously similar to the cam mounted at the front of the vehicle and is advantageously attached in a similar way to the latter to the damper springs at the rear of said vehicle. In this embodiment, inclination of the chassis automatically inclines the four wheels. In one advantageous embodiment, trailing arms are used instead of superposed triangles, but the cam, or a similar cam, is kept.

For better roadholding the use of a differential to drive the driving wheels via pulley and belt mechanisms or a chain and sprockets, or even universal joints, is strongly recommended. However, to reduce costs and in view of the small width of the vehicle, the drive line may connect to only one wheel.

In a preferred embodiment of the invention, the vehicle is equipped with at least one sliding door which occupies less space around the vehicle when opened. This particular embodiment of the door also avoids rocking the vehicle, the point of this being that since the vehicle is narrow, its support polygon is smaller than that of a conventional car. If the door of the vehicle were pivoted about a vertical axis, as is conventional per se, the weight of the door when open might shift the vehicle's center of gravity outside of the support polygon, which would destabilize the vehicle, especially if someone were to lean on the open door.

It is also advantageous to locate the power train underneath a seat of the vehicle. This makes it possible to keep the vehicle as short as possible, in order for example to free up storage space at the rear of the vehicle. In the case of a vehicle according to the invention having two seats, it is advantageous to locate the power train underneath the rear passenger seat.

In the case of an electric vehicle, it is advantageous to locate a motor in each driving wheel. This substantially reduces the number of parts of the power train by dispensing with the differential, axle shafts and universal joints, if any. In this context it is advantageous to locate the electrical power supply underneath the seats, whether it is batteries or fuel cells.

In one particular embodiment of the vehicle according to the invention, the cabin has a front seat and a rear seat, one placed behind the other, to accommodate a driver in front and a passenger behind (or two children). Each of the two seats may have a horizontal squab and a seat back, and these are advantageously independent. In one advantageous embodiment the squabs of both seats are a single component. It is advantageous for the seat back of the driver's seat to be pivoted about a preferably vertical axis so that it can be placed against the body to enable said passenger to enter the rear seat. Means are also provided for locking the seat back in the driving position so that the back does not move if, for example, the driver slows the vehicle suddenly.

The back of the rear seat can advantageously be moved translationally to place it against the back of the front seat, if there is no passenger, in order to free up more storage space in the rear of the vehicle.

In the context of this advantageous embodiment, the back of the rear seat back is provided with a movable tray that advantageously pivots between a position in which it forms a floor for the luggage space of the vehicle, covering the horizontal squab of the rear seat, to protect the squab particularly when the back of said rear seat is placed against the back of said front seat, and a position in which the tray is placed against the back of the seat back.

The body of the vehicle advantageously forms a protective cabin for at least one person installed in the vehicle. The driver installed in the cabin is therefore completely sheltered from the weather. In this embodiment it is advantageous to give the cabin a form such that its width at the top is narrower than its greatest width. In this way the space taken up by the vehicle in terms of width is reduced at the top of the body, and this allows the vehicle to fit more easily between cars in traffic queues, even if the vehicle is inclined. Furthermore it also means that the rearview mirrors can be mounted at the top of the body where they do not project from the body, so that the width of the vehicle is no greater than the width of the body.

By means of its various features defined, described and illustrated either above or below, and in the form in which these features can advantageously be applied in industrial practice, the invention provides drivers with a vehicle which, among other things:

- can be parked easily in urban environments and moves easily between cars in traffic jams, owing to its small dimensions;
- is stable when cornering or on uneven surfaces because it allows the wheels and chassis of the vehicle to be inclined;
- does not, in the event of emergency braking, fall onto its side on the ground (unlike two-wheeled vehicles);
- drives intuitively by the inclination of the cabin which occurs naturally when cornering, in the embodiment without feedback;
- offers protection to the driver (and his passenger depending on the embodiment) in the event of an accident or impact, or from the weather, depending on the embodiment;
- owing to its limited inclination, offers the advantage in automotive traffic when compared with two-wheeled vehicles which are necessarily compelled to lean sharply in order to remain stable when making sudden changes of direction.

BRIEF DESCRIPTION OF THE DRAWINGS

The invention will now be more completely described in the context of various preferred embodiments and their advantages, with reference to FIGS. 1-10, in which:

FIG. 3 is a front view of a vehicle according to the invention in which the protective structure comprises a non-closed body and in which the wheels are upright;

FIG. 4 shows the vehicle seen in FIG. 3 in a front view, the wheels and cabin leaning to the vehicle's right;

FIG. 5 shows the vehicle according to the invention from FIG. 1 in a top view;

FIG. 6 shows the vehicle according to the invention from FIG. 1 with the door open, in a top view;

FIG. 9 is a schematic view of a vehicle according to the invention with one side parked or traveling on a sidewalk;

and FIG. 10 a schematic view of a vehicle according to the invention when taking a tight corner or when cornering at speed.

DETAILED DESCRIPTION OF EMBODIMENTS

Figure 1:
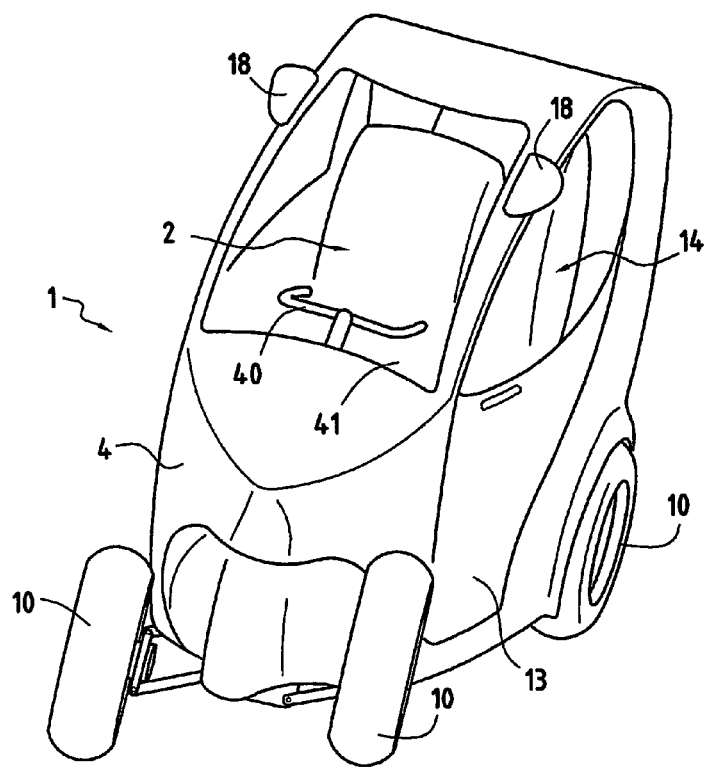
FIG. 1 is a perspective view of a vehicle model according to the invention comprising a protective body leaning to its left, its front wheels being turned and leaning to the vehicle's left.

As FIG. 1 illustrates, the invention relates to a motor vehicle 1 comprising a protective structure for the driver consisting of a completely closed body 4. It comprises four wheels 10 and the two wheels 10 mounted at the front of the vehicle are steered wheels while the two wheels 10 mounted at the rear of the vehicle are driving wheels. The motorized vehicle 1 comprises a power train 19 (visible in FIG. 2), and the engine (or engines) of the power train 19 may be of thermal, electrical, pneumatic, hybrid or other type.

The vehicle has a driver's seat 2 with a horizontal squab and a seat back 22 (FIG. 4). The driver's seat 2 is located in a cabin of dimensions such that it can accommodate in width only one person 9 (shown in FIG. 2). The width of the vehicle, that is to say the distance between the respective planes of the two front wheels 10 (or between the respective planes of the two rear wheels) may thus be between 50 cm and 100 cm. Advantageously, in the context of this embodiment, the vehicle has a width of 60 cm, allowing it to pass between two motor cars, given the widths of most urban roads.

Figure 2:
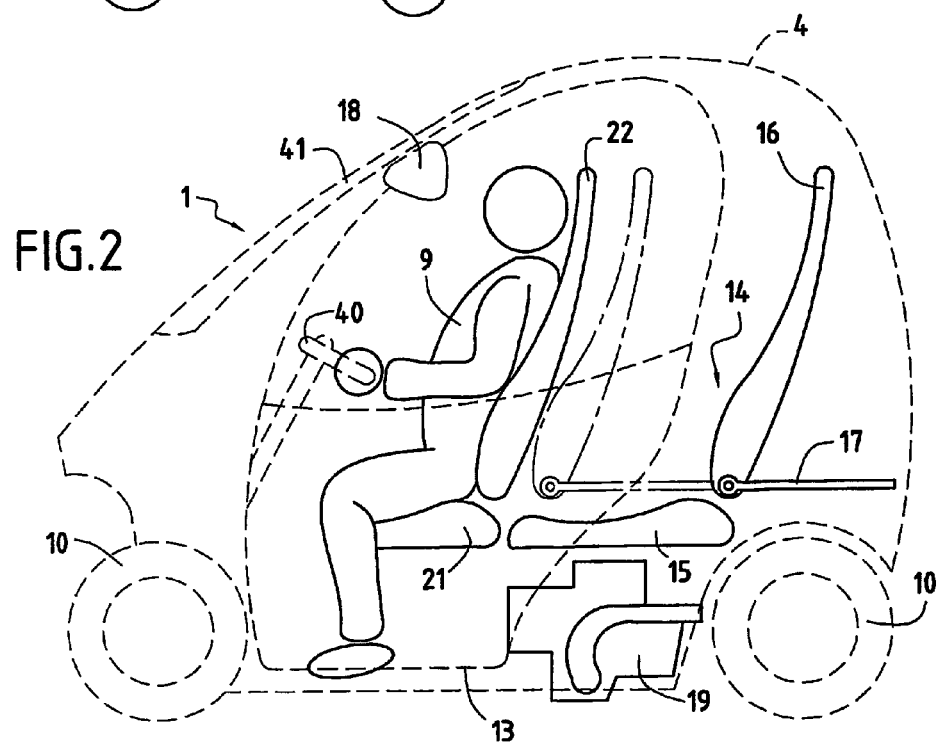
FIG. 2 illustrates the vehicle according to the invention shown in FIG. 1, with a driver inside, in a side view.

FIGS. 2, 5 and 6 show the interior of a vehicle according to the invention designed to accommodate one passenger in addition to the driver. The cabin thus has two seats: a front seat 2 and a rear seat 14, the two seats 2 and 14 being placed one behind the other to accommodate a driver in front and a passenger behind.

Each of the two seats has a horizontal squab and a seat back. Consequently, the rear seat 14 has, like the front seat 2, a horizontal squab 15 and a seat back 16. As can be seen in FIGS. 5 and 6, the squabs 21 and 15 may be made in one piece. They can also be made separately as shown in FIG. 2.

In order that the passenger can gain access to the rear seat, the seat back 22 of the driver's seat 2 pivots about an axis which, in this embodiment, is vertical, allowing it to be placed against the inside of the body of the vehicle. To do this, the back 22 of the front seat 2 has a lateral arm 23 connected by a hinge to a post connected to the vehicle body inside the cabin.

On the opposite side of the seat from the arm 23, the inside of the body is equipped with means of securing the seat back (not shown in the figure) in order to secure the back of the seat in the fixed position when the vehicle is in use.

Concerning the rear seat 14, its back 16 can be moved translationally along at least one longitudinal rail (not shown). In this way the back 16 of the rear seat 14 can be placed against the back 22 of the front seat 2 to give more storage space at the back of the vehicle if there is no passenger.

The back 16 of the rear seat 14 is also equipped with a tray 17. The tray 17 pivots on the back of the seat 16 about an axis parallel to the plane of the seat back 16. It serves as the floor of the luggage space of the vehicle when it is in the open position and when the back 16 of the seat 14 is in a position such that a passenger can sit down. When the tray is opened and the back 16 of the seat 14 is placed against the back 22 of the front seat, the tray 17 covers the horizontal squab 15 of the rear seat 14, making a more convenient flat surface on which to place objects. The tray 17 also protects the squab 15.

The cabin is mounted on a chassis 3 (FIGS. 3 and 4) which is built into the body 4 for the protection of the driver. "Built into" will be understood to mean that the chassis 3 and the body 4 are fixed together.

The chassis 3 advantageously comprises two arcs, one at the front and one at the rear of the vehicle. These are connected to each other by at least one connection in such a way that the assembly is stiff enough to withstand in particular the twisting forces and the forces of thrust and traction which it experiences during driving of the vehicle. The assembly can also provide protection in the event of the vehicle overturning. The chassis 3 is also equipped with a "crash box" type of shock-protection assembly in case of accident, at least at the front of the vehicle.

As can be seen in FIG. 1, the body 4 is made in such a way that it forms a cabin to protect the driver from the weather, said cabin comprising reinforcements on the sides of the vehicle to protect at least the driver's legs should the vehicle tip over or in the event of an impact. The body 4 is further equipped at the front of the vehicle with a bumper 41.

For greater stability, the vehicle 1 is designed so that its weight is concentrated relatively close to the ground. To accomplish this, the body is among other things narrower at the top than at its widest part. The vehicle thus occupies less space. It also means that the rearview mirrors 18 can be positioned at the top of the body without making the vehicle take up more width on a road than the width occupied by its body lower down. The power train 19 is also located underneath a seat; more particularly, the power train 19 is placed underneath the squab 15 of the passenger seat 14 (FIG. 2). This arrangement also frees up storage space at the rear of the vehicle.

For access to the engine, the vehicle body may be fitted with access flaps in the sides. Another possibility is to make the horizontal squab 15 of the seat 14 removable. Neither the access flaps nor the means of removing the squab 15 have been shown in the figures.

According to the invention, the vehicle 1 comprises balancing means which are operational during cornering and on ground sloping relative to the horizontal: they function by simultaneous inclination of the chassis 3 connected to the cabin of the vehicle and of at least the two front wheels 10 of the vehicle. The balancing means are connected to the chassis 3. For greater stability of the vehicle 1 when the front wheels 10 are leaning, the wheels 10 are such that they have at least one oval tread, like motorcycle wheels. Furthermore, the angle of inclination of the front wheels 10 and that of the chassis with respect to a vertical plane are the same as each other to ensure optimal stability of the vehicle 1 during cornering.

In the context of this embodiment, the vehicle is equipped with a handlebar 40 (FIGS. 1, 2, 3 and 4) as it has been observed that the driver leans the cabin to balance the vehicle in a more intuitive way when the vehicle has a handlebar 40 rather than when it has a steering wheel. However, the steering means of the vehicle can also be a steering wheel, especially if the vehicle comprises a closed protective body along the lines of a car body, or if leaning is brought about automatically by a servomechanism.

The vehicle 1 also has means for locking the inclination of the two front wheels 10 and of the chassis 3 when the vehicle is at rest or moving at low speed. The inclination locking means of the wheels 10 consist of a control device which at zero or low speed locks the inclination of the chassis 3 at the angle of inclination present at the moment of locking.

The vehicle 1 is also equipped with means for limiting the angle of inclination to a maximum value. This limitation may be variable as a function of the speed.

This limitation is such that, even if the inclination prevention mechanism is no longer working, or if it is not used, the vehicle cannot roll over, particularly at rest. This may be achieved by means of a mechanical stop. On the other hand, at high speed, this stop may be moved to allow a greater maximum inclination, which may be useful for improving the dynamic behavior of said vehicle.

FIGS. 3 and 4 relate to a vehicle whose protective structure is a body that is wider than the legs of the driver and protects them, together with a shield 30 with two headlights 31. The steering column 34, which is connected to the handlebar 40, passes through the shield 30 in such a way that it is able to pivot relative to the latter.

As can be seen in these FIGS. 3 and 4, the means of balancing the vehicle 1 by inclination of the front wheels 10 and the chassis 3 consist of two jointed parallelograms connecting the chassis and the front wheels and allowing the chassis and the front wheels of the vehicle to be inclined simultaneously through an approximately equal angle, by means of the cam 7. A similar device can also be provided to incline the rear wheels, in which case the balancing means comprise the same cam 7.

These jointed parallelograms are arranged on either side of the chassis 3. They comprise two arms 5 and 6 each having one end 51, 61, respectively, pivoting on the chassis at the front of the vehicle, while their other end 52, 62, respectively, pivots in an element 11 fixed to the hub 12 of each of the front wheels 10. The arms 5 and 6 thus form a jointed four-arm axle (two arms 5 and two arms 6) giving simultaneous inclination of the two front wheels 10 and of said chassis 3 which is connected to the cabin of the vehicle 1.

In the embodiment described here according to the invention, one end of a T-shaped cam 7 is pivoted to the chassis 3 at the front of the vehicle. Two suspension-type damper springs 8 are each fixed by one end, on one or other side of the chassis 3, to one of the arms of the axle. They are preferably fixed to the arm 6 that is the lowest relative to the ground and close to the wheel 10, for maximum damping efficiency. The other ends of the two damper springs 8 are pivoted to the other ends of the cam 7 preferably in such a way that the axes of the damper springs 8 remain as nearly as possible perpendicular to a horizontal plane. Thus positioned, the damper springs 8 give optimum shock absorption when, for example, the vehicle is traveling on bumpy ground, or descending from a sidewalk.

Figure 8:
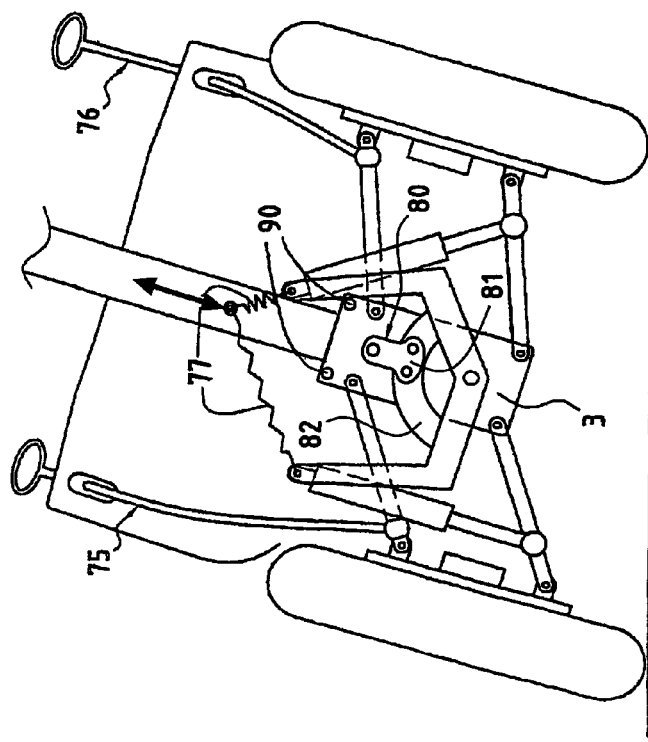
FIG. 8 is a partial view of a vehicle according to the invention fitted with a second embodiment of righting means.

The cam 7 is advantageously T-shaped, as shown in FIGS. 3 and 4, or in the shape of an open lyre, as shown in FIGS. 8 and 9 (reference 80) to save space in the center. The inclination locking means of the vehicle according to the invention are designed to lock the inclination when the vehicle is at rest or nearly at rest. In the particular embodiment considered, they consist essentially of a brake which locks the cam 7 in its current position. The brake mechanism is advantageously mounted to the chassis, and either the part to be locked is connected to the cam 7, or the part to be locked is part of the latter.

Figure 7:
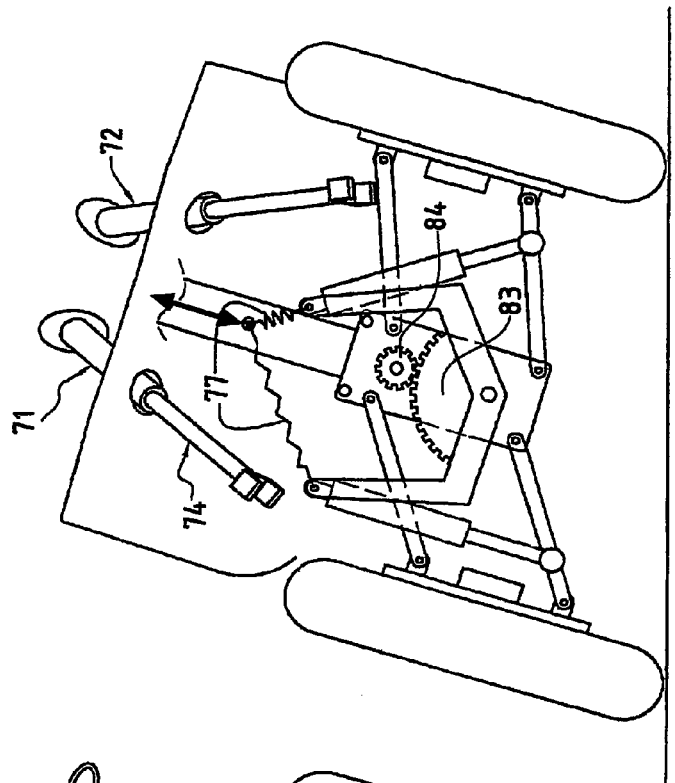
FIG. 7 is a partial view of a vehicle according to the invention fitted with a first embodiment of righting means.

The brake is shown in FIGS. 7 and 8. In FIG. 8 the brake comprises a jaw 81 connected to the vehicle chassis and a part connected to the lyre-shaped cam 80, which is a sector of a disk 82 which can be locked by the jaw 81: this locks the inclination of the vehicle. FIG. 7 shows another embodiment of the inclination locking brake. In this case a gear system 83 is connected to the lyre 80. It meshes with a pinion 84 connected rotatably to the chassis.

In the context of the preferred embodiments of the invention, the brake is operated automatically when the vehicle is slowed to a lower threshold speed in order to be stopped, and, when it is stopped, to lock the inclination of the vehicle. Similarly, the brake releases automatically when the vehicle pulls away, either as soon as it starts moving or above a certain speed.

This brake may advantageously be used to lock the inclination of the vehicle when the residual transverse acceleration (RTA) is not zero, thus preventing the vehicle from righting itself in the direction of the centrifugal force and potentially rolling over in that direction.

The vehicle illustrated in FIG. 1 is designed so that the balancing means incline all four wheels 10 simultaneously. For this purpose the vehicle 1 also has two arms at the rear which are pivoted in pairs on either side of the chassis 3, together with a second cam mounted to the rear of the chassis 3, the second cam being similar to the front cam 7 and being mounted in a similar way to the rear of said vehicle on the chassis 3.

It is also possible to use pulled rear wheels held by arms parallel to the chassis using the same type of cam 7.

Moreover, the vehicle 1 may be equipped with a system for automatically inclining the vehicle 1. This system, not shown in the drawings, has among other things means for bringing about an actual inclination of the vehicle in such a way that it is not unbalanced. A computer has the task of feeding information to the system that controls the inclination of the vehicle based on information supplied to it, for example from the value of the RTA.

The driver may also give instructions to the system based on his driving habits. For example, the driver may teach the system with the help of a housing fitted with a slider that can be moved through various positions, each position of the slider corresponding to one predetermined driving style.

The area represented by the support polygon on the ground means that the ideal angle of inclination can be observed with some degree of inaccuracy without affecting the stability of the vehicle when cornering, which contrasts with two-wheeled vehicles where the greatest accuracy is necessary if the vehicle is not to fall over immediately.

The system is advantageously designed in such a way that it can automatically correct the inclination of the vehicle.

For this purpose the computer determines the ideal angle of inclination of the vehicle based on various parameters which it takes into account (notably the loaded weight of the vehicle, its speed and the slope of the ground on which the vehicle is resting relative to the horizontal), and it compares this ideal angle of inclination with the actual angle of inclination of the wheels, of the chassis and of the cabin. A feedback mechanism ensures that the inclination of the vehicle corresponds to the driver's selection.

Many intermediate solutions are conceivable. In particular, the system may incline the wheels, the cabin and the chassis in accordance with information which the driver gives it. The driver may choose to have the system correct the inclination of the vehicle only once it detects a certain deviation between the actual angle of inclination and the ideal angle of inclination.

The means enabling the system to determine the ideal angle of inclination may be a combination of elements such as an accelerometer, or a galvanometer whose needle is connected to a pendulum, slightly damped to reduce undesirable oscillations.

So that the driver can get access to the interior of the vehicle 1, the vehicle is fitted with at least one sliding door 13. A sliding door 13 enables the vehicle to take up less space around the vehicle when the door is opened than would a vehicle fitted with a hinged door, as is conventional per se. Moreover, the choice of a sliding door 13 offers the advantage of not unbalancing the vehicle when the door is open, as the vehicle could rock under the effect of the weight of a hinged door.

The vehicle 1 comprises a device to allow the door to be opened a large or small amount when the vehicle is traveling at low speed, or at medium or high speed, respectively. The body is equipped for this purpose with means for locking the door in a slightly open position. These locking means may engage automatically above a predetermined speed of the vehicle for safety reasons. In this embodiment the door need not have a window.

FIGS. 7 and 8 are partial views of a vehicle according to the invention that is inclined, for example on a corner. The vehicle possesses righting means for righting the vehicle easily if it is not in the vertical position.

In an initial embodiment shown in FIG. 7, the righting means are two pedals 71 and 72 that can slide through an internal wall 73 of the vehicle. At the lower end of each pedal is a sort of fork 74 which just touches the end 52 of the horizontal upper arm 5 of the balancing parallelogram, close to the wheel hub when said arm is in the highest position. When the driver wishes to right the vehicle, he pushes on the pedal situated on the lowest side of the vehicle, which corresponds to an instinctive action; he can thus right the vehicle and return it to the vertical position. Operating a righting pedal can automatically release the locking means so that the driver is not required to perform any other action to release it and make righting of the vehicle possible, or it may be released by another hand control, such as a pushbutton accessible to the driver. When depressed in this way, the pedal pushes on the end 52 of the arm 5 that is situated on the lowest side of the vehicle, thereby applying a downward, approximately vertical force which tends to return the deformable parallelogram to the normal position, corresponding approximately to a rectangle, seen in FIG. 3.

In a second embodiment, shown in FIG. 8, these righting means consist of two links 75 and 76 able to slide through the front floor 73 of the vehicle. The lower end of each link is attached to the end 52 of the horizontal upper arm 5 of the balancing parallelogram, close to the wheel hub. When the driver wishes to right the vehicle, he pulls on the link situated on the highest side of the vehicle, which again corresponds to an instinctive action, to right the vehicle and return it to the vertical position.

This action on the link pulls on the end 52 of the arm 5 that is on the highest side of the vehicle and applies an upward and approximately vertical force tending to return the deformable parallelogram to the normal position, corresponding approximately to a rectangle, seen in FIG. 3.

Another possible variant uses two pedals, similar to the pedals 71 and 72 of FIG. 7, each designed to operate by pulling on the arm 5 situated on the opposite side to the pedal itself. In this way it is possible to act vertically on the arm rather than along an inclined axis as in the embodiment shown in FIG. 7. In this way the working travel of the pedal can be shortened. It should be pointed out that a foot acting on a pedal can apply greater force than an arm pulling on a link.

It is also possible to provide embodiments of the righting means that use electrical or hydraulic actuators, such as actuating cylinders.

Just as the vehicle and the four wheels can be inclined by inclining the chassis alone, without having to simultaneously incline both the front and rear wheels, so there is no necessity to fit righting means at the front and rear. It is even preferable to put them at the front only, as they are more efficient with the wheel caster which it is necessary to apply to the front wheel steering geometry.

FIGS. 7 and 8 show righting means by which the vehicle can be righted if it is not in the vertical position. They take the form of two springs, e.g. helical springs 77 whose upper ends are fixed to a pivot on a part of the chassis 3 and whose lower ends are fixed to the upper ends of the damper springs 8. Particularly when at rest, these righting means slowly return the vehicle to a symmetrical vertical position which can then be locked.

In FIGS. 7 and 8 a double arrow indicates the fact that the attachment point of the springs 77 can be moved vertically between two limit positions, e.g. by means of an actuating cylinder. When this attachment point is raised, it stretches the springs 77. This can be useful for increasing the force the driver has to exert to make the vehicle incline, as a function of speed, such that at low speeds the force is greater than at high speeds.

FIGS. 9 and 10 illustrate certain advantages of the vehicle according to the invention over vehicles that have no balancing means in accordance with the present invention. In the case of FIG. 9, one side of the vehicle is on a sidewalk, either moving or parked. The balancing means keep the vehicle vertical so that there is no risk of it rolling over away from the sidewalk, even if the vehicle is narrow.

The case of FIG. 10 is where the vehicle is traveling around a tight corner or taking a corner at speed. Because of the inclination of the vehicle 1, the resultant R of the forces, acting through the center of gravity G of the vehicle, which depend notably on its loaded weight P, its velocity and the slope of the ground on which the vehicle is resting (and therefore on the resulting horizontally oriented centrifugal force C), as well as on the force of the wind, if any, passes through the support polygon of the vehicle, in other words between the four wheels of the vehicle.

One feature of the invention is that the inclination of the vehicle is advantageously limited to a value that can be less than the so-called ideal inclination. The ideal inclination of the vehicle is where the resultant R of the inclinable part of the vehicle passes through the longitudinal axis of symmetry of the vehicle's support polygon. In this case there is only the force R, which tends to press the vehicle into the ground, and there is no residual force tending to cause it to roll over on its side.

FIG. 10 shows the case where the actual inclination (axis 85) is less than the ideal inclination. In this case the resultant R can be decomposed into a force V along the axis 85 pressing the vehicle into the ground and a force RTF (designated as FTR in the figure) that is perpendicular to the axis of the inclination 85. This force RTF corresponds to a residual transverse acceleration RTA which is proportional to it. According to the invention, this residual transverse acceleration RTA is detected or measured in order to control and limit vehicle inclination. To this end a single-axis accelerometer is mounted on the chassis, preferably on the vehicle's axis of symmetry close to the average center of gravity of the inclinable part of the vehicle such that its sensitivity is oriented for example at right angles to the plane of symmetry of the chassis.

To lock the inclination when the force (RTF) of the residual transverse acceleration occurs, it is possible to use the acceleration value RTA produced by the accelerometer, and lock the inclination as soon as this value exceeds a predetermined threshold. When the force RTF decreases, the inclination lock can be released when the residual transverse acceleration RTA measured by the accelerometer falls below a second predetermined threshold (which may be different from the trigger threshold in order to provide hysteresis).

Another possibility is for the inclination lock, which engages when the RTA is above the threshold, to act only in the direction of this residual transverse acceleration and allow free inclining in the other direction. This prevents the vehicle from righting itself in the direction of the RTA (towards the outside of the bend) which could cause it to roll, while at the same time allowing the vehicle to lean in the opposite direction to the RTA and so reduce the value of the RTA, at least until the vehicle is at maximum inclination.

The lock may advantageously also be engaged when there is a sudden rise in the RTA, which is detected by comparing the derivative of the RTA with a predetermined threshold.

This phenomenon occurs when for example the vehicle is leaning on its side and the driver accelerates the vehicle rapidly, causing the vehicle to come upright and then roll over in the direction of the RTA: this is stopped by the inclination lock. In a basic version of the vehicle according to the invention, in the absence of automatic balancing means, only two sensors are necessary, one for detecting (possibly measuring) the speed of the vehicle, so that the inclination brake can be released above a certain speed, the other being an accelerometer which is mounted on the chassis and detects (possibly measures) the RTA.

In a variant of the vehicle of the invention, all the locking means are combined in one brake, which is normally in the locked position and is released only by the automatic inclination control commands within the limits set as described earlier.

In a more elaborate version, the various functions are advantageously controlled by automatic means, which include the abovementioned detector, a computer, and automatic vehicle inclination means, such as an actuating cylinder or a drive pinion turned by a "generally electric" motor which is itself controlled by the feedback and the computer (from the RTA information, for example). In this case the stop that defines the inclination limit can be built into a gear system, the sector gear being connected to the cam 7 or to the actuating cylinder control.

In another variant, in the case of a vehicle that inclines all four wheels, two inclination lock brakes may be provided, one brake at the front and one at the rear, the front brake locking the inclination when the RTA (or its derivative) is above the predetermined thresholds, and at reduced speed, making the locking action gentler because of the greater flexibility of the front wheel steering geometry, the rear brake and the front brake together locking the inclination more rigidly when at rest. Lastly, in FIG. 8, fixed stops 90 can be seen: these are mounted on the chassis and limit the relative inclination between chassis and cam, and therefore the inclination of the vehicle, to a maximum value.

The above description explains clearly how the invention achieves its intended objects.

In particular it will now be seen how, in its overall conception and despite its small width, the vehicle which has been described in detail is very stable.

In particular it is possible to produce a vehicle of narrow width, for example a width of about 60 cm, whose center of gravity is about 60 cm above the plane of contact of the wheels with the ground. At rest and at low speeds the maximum inclination is limited by the inclination limiting means to around 18 degrees. This limit can be raised to some 25 degrees for high-speed driving, corresponding to an angle of 45 degrees in the case of a motorbike (which is a very large angle).

It will nevertheless be clear from the above that the invention is not limited to those embodiments which have been specifically described and illustrated in the figures.

For example, the vehicle according to the invention could be provided with two doors. This would allow the driver to park against a wall without having to consider the orientation of the vehicle relative to the wall in order to be able to alight.

Similarly, the second door could be mounted in such a way as to offer direct access to the rear passenger seat, in which case it would be advantageous to have the door mounted so that it slides from the rear of the vehicle to the front of the vehicle in order not to project beyond the front of the vehicle body when open.

More simply, in the case of a single door, a safety opening would allow the occupant or occupants to get out of the vehicle if it rolled onto its door side, preventing said door from being opened.

Finally, it must be understood that the vehicle according to the invention can be fitted with all the safety items such as seatbelts, windscreen wipers, and the traction control or antilock brake system. The vehicle may also be equipped with accessories such as heating, air conditioning, a sunroof with a soft top or a removable hard top, a radio, a cassette or CD player, a computerized navigation system, an electric door opening control, and all the other commercially available vehicle comfort or safety accessories. The vehicle according to the invention could also be provided in a range of versions such as minivan, delivery truck, 4×4 or off-road, and racing vehicle.

The invention claimed is:

1. A motor vehicle, comprising:
a driver's seat contained in a cabin that accommodates in width only one person, said cabin being mounted on an inclinable chassis comprising a driver protection structure,
balancing means connected to said chassis for balancing the vehicle when cornering or when on a ground sloping relative to a horizontal direction, by simultaneous inclination of said chassis and of at least front wheels of said vehicle relative to the ground, said balancing means allowing said chassis and wheels to incline at an angle of inclination having a value different from an ideal inclination angle value, such that a resultant of forces as applied to the a center of gravity of said chassis passes between said wheels while maintaining vehicle balance,
means for locking said inclination when the vehicle is at rest or moving at reduced speed,
and means for limiting said inclination to a maximum value such that, on horizontal ground and at said maximum inclination, the vehicle at rest does not roll over.

2. A vehicle as claimed in claim 1, wherein said balancing means comprise a servomechanism controlling said inclination of said chassis and wheels.

3. A vehicle as claimed in claim 2, wherein said servomechanism forms further said means for locking said inclination.

4. A vehicle as claimed in claim 1, in which said balancing means comprise means for varying, as a function of a speed of the vehicle, a force magnitude which the driver has to exert to bring about said inclination, said function being such that at low speeds the force is greater than at high speeds.

5. A vehicle as claimed in claim 1, wherein said balancing means comprise a cam pivoted at one end to said chassis, and two damper springs, each having one end attached on one or other side of said chassis to one of axle arms while the other ends of said two damper springs are pivoted directly to the cam.

6. A vehicle as claimed in claim 5, wherein said springs are attached to either of said axle arms close to the respective wheel and pivoted to the cam in such a way that an axis of each of said damper springs is retained along a vertical direction.

7. A vehicle as claimed in claim 1, wherein said balancing means comprise means for detecting a residual transverse acceleration to which the vehicle is subject and means for locking said inclination of said chassis as a function of said residual transverse acceleration in a direction of said residual transverse acceleration.

8. A vehicle as claimed in claim 1, wherein said inclination limiting means comprise means for varying said maximum inclination as a function of a speed of the vehicle in such a way that at low speeds said maximum inclination is less than at high speeds.

9. A vehicle as claimed in claim 1, further comprising righting means for righting the vehicle if it is not in a vertical position.

10. A vehicle as claimed in claim 1, further comprising means available to the driver for releasing on demand said inclination-locking means, thereby enabling the vehicle to be restored to a vertical position at rest.

11. A vehicle as claimed in claim 1, as equipped with at least one sliding door occupying less space around the vehicle when opened, avoiding the risk of vehicle roll-over.

12. A vehicle as claimed in claim 1, wherein said cabin comprises a front seat and a rear seat, one placed behind the other, to accommodate a driver in front and a passenger behind, each of the two seats having a horizontal squab and a seat back, and wherein the back of the driver's seat pivots about an axis so that it can be placed against a body to enable said passenger to enter said rear seat.

13. A vehicle as claimed in claim 7, further comprising a front seat and a rear seat, one placed behind the other, to accommodate a driver in front and a passenger behind, each of the two seats having a horizontal squab and a seat back, wherein the back of the rear seat can be moved translationally and placed against the back of the front seat if the passenger is not present, in order to free up more storage space in a rear of the vehicle.

14. A vehicle according to claim 13, wherein the back of the rear seat is advantageously fitted with a tray hinged to the rear of the seat back between a position in which it forms a floor for a luggage space covering said horizontal squab of the rear seat when the back of said rear seat is placed against the back of said front seat, and a position in which said tray is placed against the back of the seat back.

15. A motor vehicle as claimed in claim 1, wherein said balancing means allows for inclination angles of said chassis and wheels that are less than said ideal inclination angle value.

* * * * *